US005370475A

United States Patent [19]
LeBlanc

[11] Patent Number: 5,370,475
[45] Date of Patent: Dec. 6, 1994

[54] EROSION BARRIER SYSTEM MADE FROM TIRES

[76] Inventor: Louis P. LeBlanc, 2151 Palisades Dr., Baton Rouge, La. 70815-1239

[21] Appl. No.: 140,843

[22] Filed: Oct. 25, 1993

[51] Int. Cl.⁵ .................................................. E02B 3/12
[52] U.S. Cl. ........................................ 405/21; 405/16; 405/20
[58] Field of Search ................................ 405/15–21, 405/30–35, 284, 262, 258; 52/DIG. 9; 47/DIG. 11

[56] References Cited

U.S. PATENT DOCUMENTS

| | | | |
|---|---|---|---|
| 1,847,852 | 3/1932 | Upson | 405/20 |
| 3,764,446 | 10/1973 | Martin | 161/36 |
| 4,080,793 | 3/1978 | Pulsifer | 405/30 |
| 4,139,319 | 2/1979 | Anderson | 405/16 |
| 4,142,821 | 3/1979 | Doring | 405/258 |
| 4,188,153 | 2/1980 | Taylor | 405/34 |
| 4,227,829 | 10/1980 | Landry | 405/20 |
| 4,286,895 | 9/1981 | Poli et al. | 405/17 |
| 4,785,577 | 11/1988 | Lederbauer | 405/284 X |
| 4,801,217 | 1/1989 | Goldberg | 404/75 |
| 4,824,286 | 4/1989 | Waas | 405/27 |
| 4,998,844 | 3/1991 | Mouton | 405/21 |
| 5,011,327 | 4/1991 | Thiac | 405/28 |
| 5,056,961 | 10/1991 | McMeans et al. | 405/284 |
| 5,178,489 | 1/1993 | Suhayda | 405/21 |
| 5,238,325 | 8/1993 | Krenzler | 405/21 |

FOREIGN PATENT DOCUMENTS 2139676 11/1984 United Kingdom .............. 405/20

Primary Examiner—Dennis L. Taylor
Attorney, Agent, or Firm—David L. Ray

[57] ABSTRACT

In accordance with the present invention there is provided an erosion barrier, and revetments made therefrom, for reducing erosion of shoreline and building shoreline including a plurality of vehicle tires connected together by cables to form a mat or mesh which may be placed along a shoreline or the bottom of the marsh or sea.

16 Claims, 5 Drawing Sheets

EROSION BARRIER SYSTEM MADE FROM TIRES

BACKGROUND OF THE INVENTION

1. Field of the Invention

The invention relates to revetments and erosion barriers. In particular, the invention is related to revetments and erosion barriers made from old vehicle pneumatic tires for preventing erosion of shore.

2. Description of the Related Art

Revetments and erosion barriers are known in the art. Exemplary of such revetments and erosion barriers are the following U.S. Patents:

U.S. Pat. No. 5,178,489 discloses a hydrodynamic control system utilizing a plurality of waste tires arranged to control hydrodynamic processes, diminishing the amplitude of waves and controlling sediment migration in bodies of water, in order to prevent shore damage, erosion or the like, while promoting restoration of same. The barrier typically includes a plurality of transversely stacked tires or the like pivotally affixed to a side, anchoring member configured to slidingly communicate with a support column embedded in the sea floor, either in orthogonal or angled fashion, depending upon the conditions and desired effect. The side members may be configured to allow two distinct, side support, hinge-like areas to independently engage with the support column, forming a wall. The present device as installed diminishes wave amplitude by absorbing the rotational movement of the affixed tires about the column. A number of diverse geometries, all designed for various specific applications and environs, utilizing the mounting system of the present invention, is disclosed. The mounting system includes a divers link arrangement wherein each tire has provided in its radial cavity a spacer configured to communicate via a bolt or the like typically with the side member exterior to the tire, which is in turn slidingly communicating with the anchoring column. The barrier arrangement provides a safe, economical, and effective system for diminishing water action damage, while utilizing an often otherwise un-recyclable resource, namely, waste tires.

U.S. Pat. No. 5,011,327 discloses an erosion barrier for use with a shoreline of tidal water having a flood and ebb phase in each tidal cycle in which a first tire barrier has a plurality of vertically stacked tiers staggered and each tier connected to the tier immediately therebeneath. The half tires are positioned with their rounded tread positioned toward the tidal source and their open portion toward the shoreline to receive soil and sand during the ebb phase of the tidal cycle and form a tire revetment. A second barrier is spaced from the first barrier and has a plurality of horizontally disposed vertically pivoted slats positioned to unseat with the flood phase of the tidal cycle and permit water, soil and sand to pass therethrough but upon cycle change to ebb the slats will close stopping tidal flow to permit the soil and sand time to settle out to form land about the barriers before tidal cycle change. This cyclical action of the tide and barriers will form a shoreline revetment to counteract shoreline erosion action.

U.S. Pat. No. 4,998,844 discloses wave actuated coastal erosion reversal system for shorelines to reduce the critical loss of thousands of acres of shoreline, beaches, and wetlands each year due to the simple loss of one grain of soil, silt, or sand, one grain at a time. The use of very thin recast concrete truncated conical sections, or "beach-cones" installed with interlocking leak-resistant interstitial "wave-blocks" in a simple geometric pattern, "reverse" the daily cycle of build-up and erosion by accelerating the "build-up" and preventing the recurring "wash-out" of sandy material picked up and carried out by retreating waves. The beach-cone geometry smoothly absorbs the energy of the wave and retaining the material deposited into the center of the "beach-cones". This process begins at the next "high-tide" after installation. The critical erosional effect of wave "undertow" is eliminated. In addition, the blockage effect of a row of beach cones builds up a new "beach" on the shore-side of the installation when the "cones" are installed at the water's edge at low tide.

U.S. Pat. No. 4,824,286 discloses an apparatus for dissipating surface waves, particularly for protecting floating or fixed structures or coasts which includes a floatable carpet formed of floating motor vehicle tires which are horizontally disposed and arranged in rows. Flexible spacers interconnect the tires in such a manner that the floating carpet provides a structure that is stiff in the horizontal direction and flexible in the vertical direction. The individual tires assume zig-zag inclinations to the portions for interconnecting the tires in the upper and lower areas thereof, and inflatable supporting hoses extending between adjacent tires in the areas between the upper and lower spacers.

U.S. Pat. No. 4,801,217 discloses a construction mat formed from discarded tire bends and method for its use which is usable in the construction, mining and the like industries wherein tire beads from used tires are tied together into an array with the use of strips of used tire casing. The mat can be used as an underpayment for roadways built over unstable ground surfaces, or a number of the mats can be superimposed one upon the other to form a blasting mat. The mats can be formed by inexpensive laborers at the construction site.

U.S. Pat. No. 4,188,153 discloses a formation of barriers which is an erosion-preventing structure for use in strengthening a river bank or in desert reclamation formed from a stack of toroidal objects such as used vehicle tires. The toroidal objects are disposed in a plurality of relatively offset layers which are held against relative movement and adjacent tires in a layer are secured together.

U.S. Pat. No. 4,142,821 discloses a ground stabilization arrangement for dam embankments and other terrain slopes and the like, including interconnected elements of old automobile tires.

U.S. Pat. No. 4,139,319 discloses a revetment made of motor vehicle rubber tires and concrete.

U.S. Pat. No. 3,764,446 discloses a structure made from discarded tire carcasses secured together by fasteners to form a chain or mat including: (a) at least one pair of whole tire carcasses, one of the pair of tire carcasses having an exterior surface portion touching an exterior surface portion of the other of the pair of tire carcasses, (b) a fastener member extending between the interiors of the pair of tire carcasses, the fastener member including an intermediate portion thereof piercing and passing generally perpendicularly through both carcasses at the point where the carcasses touch each other, the fastener member having end portions at both ends of an extending generally laterally from the intermediate portion, the end portions being in holding engagement with the interior surfaces of the tire carcasses.

SUMMARY OF THE INVENTION

In accordance with the present invention there is provided an erosion barrier, and revetments made therefrom, for reducing erosion of marsh and sea shoreline, and building shoreline, including a plurality of vehicle tires connected together by cables to form a mat or mesh which may be placed along a shoreline or in a marsh, bay or sea. The present invention has the advantage of utilizing pneumatic vehicle tires which preferably have been used and discarded to form the barrier of the invention. Furthermore, there is no need in the barrier of the invention to cut the tires or penetrate the tires in any manner prior to fastening the tires together, thus keeping the cost of the barrier of the invention at a minimum. Assembly of the barrier of the invention is easily and rapidly accomplished at the site at which the barrier is to be placed.

BRIEF DESCRIPTION OF THE PREFERRED EMBODIMENTS

Figure 1:
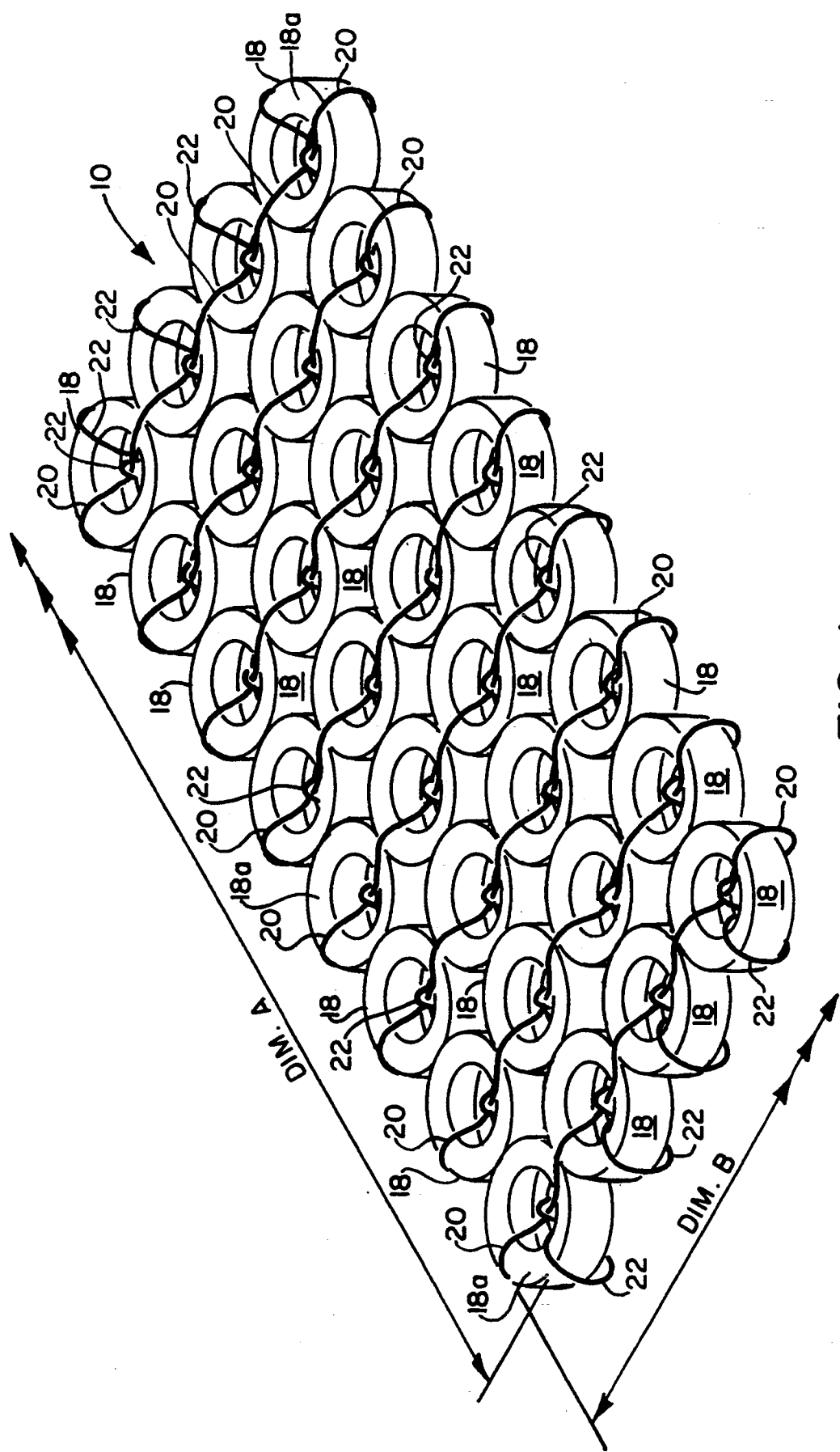
FIG. 1 is a perspective view of the erosion barrier of the invention.
Figure 2:
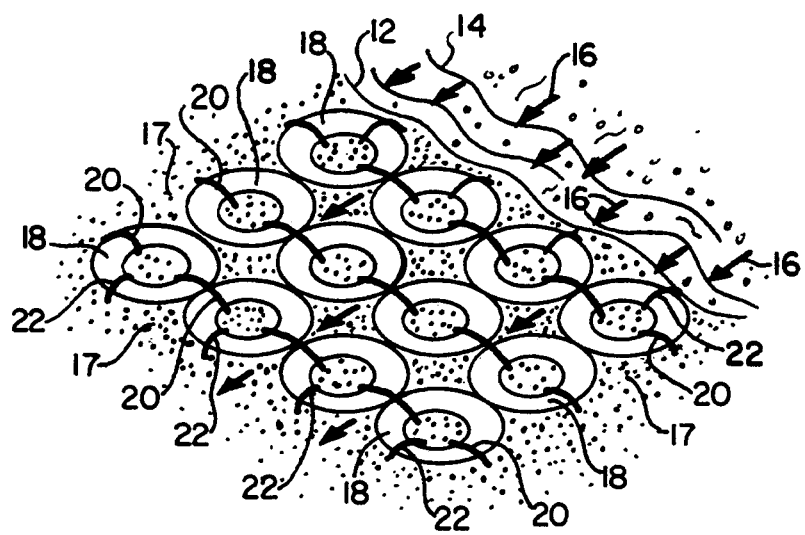
FIG. 2 is a perspective view of the erosion barrier of the invention on a shoreline.

Referring now to the drawings, in FIG. 1 is shown the erosion barrier or mat of the invention generally indicated by the numeral 10. Erosion barrier 10 is preferably generally rectangular in shape. In FIG. 2 is shown erosion barrier 10 in place along a shoreline 12 upon which waves 14 impinge in the direction indicated by the arrows 16—16. Silt and/or sand 17 fills the spaces between tires 18. After the erosion barrier is in place, sand and/or silt 17 will fill the spaces between the tires 18 and will fill the cavities 19 and voids 19a where a wheel was fitted within the tires over a period on time as waves 16 wash sand and/or silt over the erosion barrier 10. If desired, sand, silt or other soil products could be placed over the erosion barrier 10.

Erosion barrier 10 is constructed from a plurality of tires 18. Tires 18 are preferably used conventional vehicle tires such as pneumatic automobile tires. Tires 18 are generally toroidal in shape, and have a tread connected by two side walls. As is known in the art, such tires 18 are made from synthetic rubber for mounting on a rigid vehicle wheel (not shown) located in void 19a. After mounting on a wheel, the cavity 19 is inflated with air under superatmospheric pressure.

Figure 3:
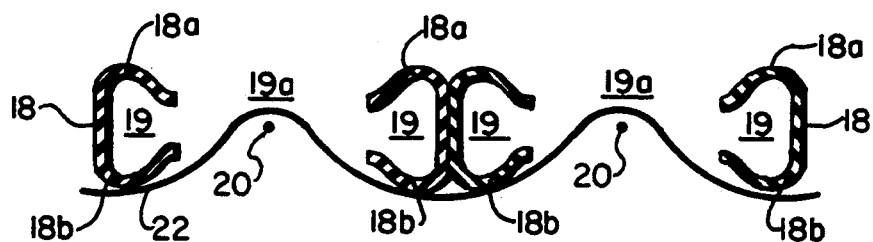
FIG. 3 is a cross-sectional, partly cut-away of two connected tires in the erosion barrier of the invention.

Tires 18 are preferably connected together in a plane or single layer one tire deep in linear rows and columns which are perpendicular to each other, with the tread of adjacent tires touching, to form erosion barrier or mat 10. The tires 18 are connected by cables 20 and 22 as shown in the drawings, in particular FIGS. 1-3, which extend the full length of the linear rows and columns of tires. Cables 20—20 are generally parallel and cables 22—22 are generally parallel. Cables 20 are preferably arranged perpendicularly to cables 22. Cables 20 are aligned with linear columns of tires 18 and cables 22 are aligned with liner rows of tires 18. Preferably cables 20 are placed over the top sidewall 18a of tires 18 and cables 22 are placed on the bottom sidewall 18b of tires 18. Cables 20 and 22 are connected in void 19a by weaving or placing the cable 22 over cable 20 to interlock the two cables.

Figure 4:
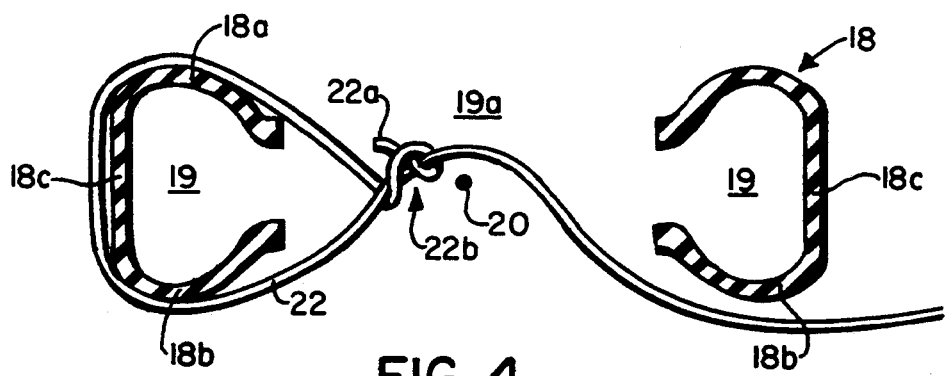
FIG. 4 is a cross-sectional, partly cut-away view of a tire connected to an edge of the erosion barrier of the invention.

As shown in FIG. 4, cables 22 are tied at each end 22a—22a to the tires forming the two outer edges of rectangular erosion barrier 10 parallel to DIM B in FIG. 1 of erosion barrier 10. Cable 22 can be seen to be wrapped around the top sidewall 18a, tread 18c, and bottom sidewall 18b of tire 18, and end 22a tied in a knot 22b to itself in void 19a of tire 18. If desired, end 22a could be fastened to itself in void 19a by a clamp or other conventional fastener known in the art. Cable 20 is tied at each end (not shown) to itself in an identical manner to the two outer edges of erosion barrier 10 parallel to DIM A, or clamped or fastened by a conventional fastener as indicated for end 22a.

Figure 9:
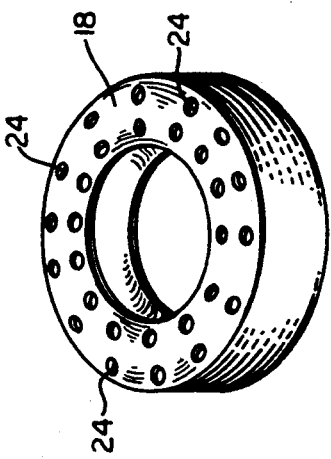
FIG. 9 is a perspective view of a perforated tire used in the erosion barrier of the invention.

To facilitate and hasten the cavity 19 of tire 18 to fill with silt or sand, a plurality of holes 24 may be made in the sidewalls of tire 18 as shown in FIG. 9.

Figure 5:
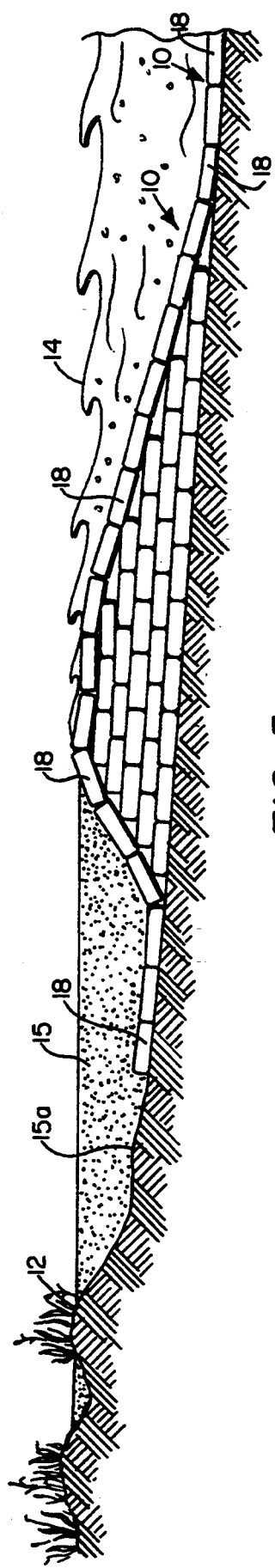
FIG. 5 is a partly cross-sectional side view of a revetment constructed from the erosion barrier of the invention.

To prevent erosion of the shoreline 12 or the bottom 13 of a body of water 15 such as a lake or bar, a plurality of erosion barriers 10 may be placed in three or more layers or tiers on the bottom 15a of a body of water 15 to form a revetment or barrier that withstands waves as shown in FIG. 5 at a distance from the shoreline 12. An upper layer or tier of erosion barrier 10 can then be placed over the top of the revetment to cover and protect the inshore and offshore edge of the revetment from waves 14 as shown in FIG. 5. The space or volume between the revetment shown in FIG. 5 can then be filled with silt, sand or other earth products by a crane, pump, or dredge to extend the shoreline outward into the body of water 15 thereby reclaiming land lost to erosion by the body of water 15. Waves 14 striking the revetment shown in FIG. 5 can carry sand, silt and other earth products over the revetment and into the space between the revetment and the shoreline to extend the shoreline outward into the body of water 15, thereby reclaiming shore lost to erosion by the body of water 15 without requiring filling by other means such a pumping or dredging.

Figure 6:
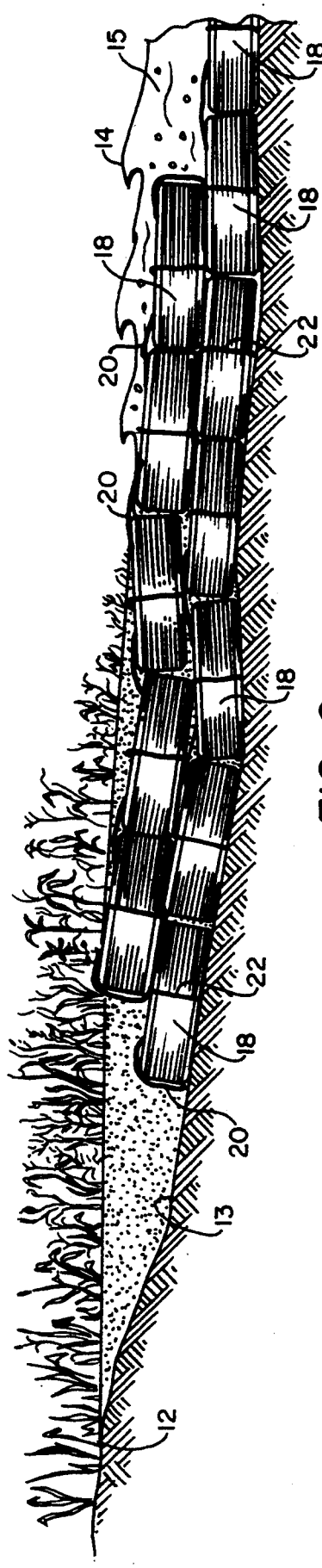
FIG. 6 is a partly cross-sectional side view of a double layer of erosion barrier partially filled with sand, silt or other earth products.
Figure 7:
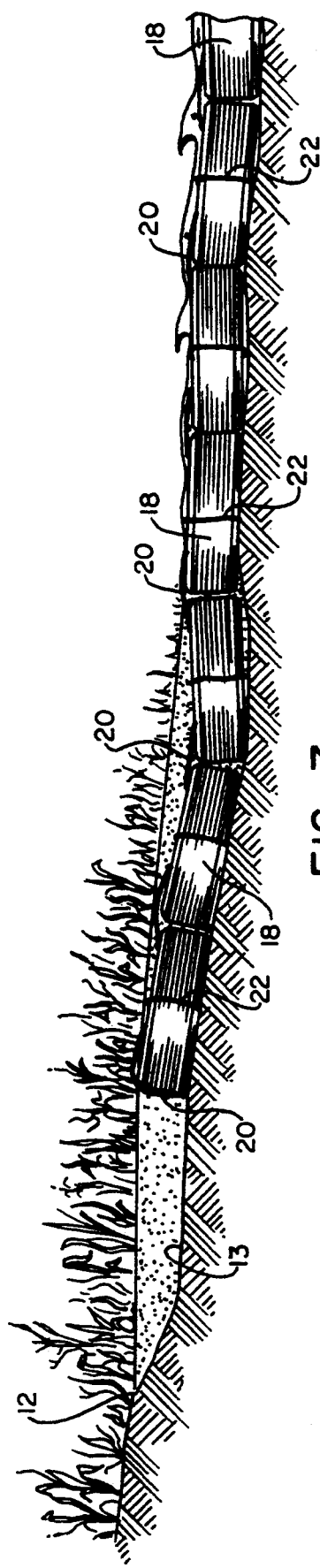
FIG. 7 is a partly cross-sectional side view of a single layer of erosion barrier partially filled with sand, silt or other earth products.

In FIG. 6 is shown two layers of erosion barrier 10 which have been covered with silt, sand or other earth products to extend the shoreline into the body of water 15 and to reclaim the shore lost to erosion. In FIG. 7 is shown one layer of erosion barrier 10 which has been covered with silt, sand or other earth products to extend the shoreline into the body of water 15 and to reclaim the shore lost to erosion.

Figure 8:
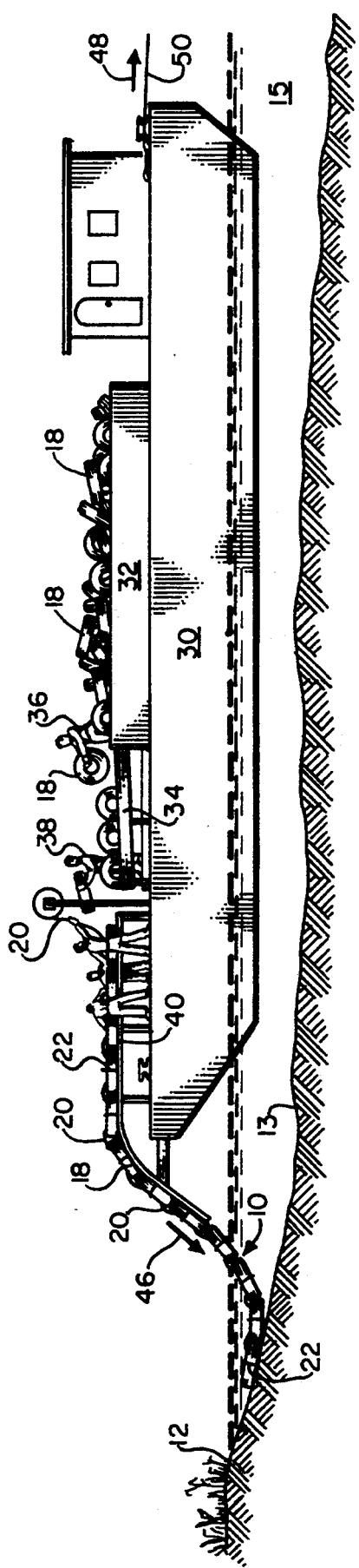
FIG. 8 is a side view of the erosion barrier of the invention being assembled on a barge and placed on a shoreline.

In FIG. 8 is shown a barge 30 on which the erosion barrier 10 of the invention may be constructed and placed on the bottom of a body of water 15 to prevent erosion and reclaim shore. As can be seen in FIG. 8, tires 18 are stored in a container or bin 32. Tires 18 are removed from the bin 32 and placed on a conveyor or chute 34 by a worker 36. A worker 38 then places a tire 18 on an assembly table 40 where another worker 42 pulls cable 20 or 22 stored on a reel 44 to weave the tires 18 together to form erosion barrier 10. Erosion barrier 10 is then placed in the body of water 15 in the direction indicated by the arrow 46 as barge 30 moves in the direction indicated by the arrow 48. Barge 30 may be moved slowly by cable 50 connected to a ship, barge, or piling.

Although the preferred embodiments of the invention have been described in detail above, it should be understood that the invention is in no sense limited thereby, and its scope is to be determined by that of the following claims:

What is claimed is:

1. A mat for preventing erosion of shore and for reclaiming shore comprising:
   a. a plurality of whole pneumatic vehicle tires having treads and sidewalls and a void in the center thereof, said tires being oriented on their sidewalls to form a single layer one tire deep, said tires being aligned in perpendicular rows and columns in said layer with the treads of tires in adjacent rows and columns touching, said layer having a top side and a bottom side,
   b. a plurality of generally parallel first cables extending the full length of said rows and connecting adjacent vehicle tires in each of said rows together, said first cables being located on said top side of said layer, a single one of said first cables connecting a single row of said rows of tires, and
   c. a plurality of generally parallel second cables extending the full length of said columns and connecting adjacent tires in each of said columns together, said second cables being located on said bottom side of said layer, said second cables being generally perpendicular to said first cables, a single one of said second cables connecting a single column of said columns of tires, each of said first cables being connected to each of said second cables at each of said tires in said void in said tire by placing said second cable over said first cable to interlock said first cable with said second cable.

2. The mat of claim 1 wherein said first cables and said second cables extend the full length of said rows and said columns of said tires.

3. The mat of claim 1 wherein each of said first cables are generally parallel.

4. The mat of claim 3 wherein each of said second cables are generally parallel.

5. The mat of claim 4 wherein a single one of said first cables connects a single row of said rows of tires.

6. The mat of claim 5 wherein a single one of said second cables connects a single column of said columns of tires.

7. The mat of claim 6 wherein each of said first cables is connected to each of said second cables at each tire.

8. The mat of claim 7 wherein each of said first cables is connected to each of said second cables by weaving said first cable over said second cable to interlock said first cable with said second cable.

9. The mat of claim 1 wherein said first cables are located on said top side of said mat.

10. The mat of claim 9 wherein said second cables are located on said bottom side of said plane.

11. The erosion barrier of claim 1 wherein said rows are generally perpendicular to said columns.

12. The mat of claim 1 wherein each of said first cables has a first end and a second end, said first end being connected to the tire at one end of a single row of said rows of tires, said second end being connected to said tire at the other end of said single row of said rows of tires.

13. The mat of claim 1 wherein each of said second cables has a first end and a second end, said first end being connected to the tire at one end of a single column of said columns of tires, said second end being connected to said tire at the other end of said single column of said columns of tires.

14. The mat of claim 1 wherein said first cables are equal in number to the number of said rows of tires.

15. The mat of claim 1 wherein said second cables are equal in number to the number of said columns of tires.

16. The erosion barrier of claim 1 wherein said vehicle tires have a generally toroidal shape.

* * * * *